May 1, 1923. Re. 15,587

E. N. PAGELSEN

TILTING LOCKING STEERING WHEEL

Original Filed Oct. 30, 1919 2 Sheets-Sheet 1

Inventor

Edward N. Pagelsen

May 1, 1923. Re. 15,587

E. N. PAGELSEN

TILTING LOCKING STEERING WHEEL

Original Filed Oct. 30, 1919 2 Sheets-Sheet 2

Inventor

Edward N. Pagelsen.

Reissued May 1, 1923. Re. 15,587

UNITED STATES PATENT OFFICE.

EDWARD N. PAGELSEN, OF DETROIT, MICHIGAN, ASSIGNOR TO EDWARD H. VINCENT, OF DETROIT, MICHIGAN.

TILTING LOCKING STEERING WHEEL.

Original No. 1,365,846, dated January 18, 1921, Serial No. 334,481, filed October 30, 1919. Application for reissue filed November 9, 1922. Serial No. 599,941.

*To all whom it may concern:*

Be it known that I, EDWARD N. PAGELSEN, a citizen of the United States, and residing at Detroit, in the county of Wayne and State of Michigan, have invented a new and Improved Tilting Locking Steering Wheel, of which the following is a specification.

This invention relates to the steering mechanisms of motor vehicles, and its object is to provide a wheel which may be moved transversely to afford more room for the driver when getting onto or off his seat and which may be locked to or unlocked from the steering post, which wheel shall be positive in its operation and may be constructed at low cost.

This invention is embodied in a tilting locking steering wheel, embodying a rim and a spider, pivoted to a head which is in itself normally rotatable on the steering post, locking bolts being provided to connect the head to the steering post and to lock the wheel to the head, a cam being mounted adjacent the locking bolts and whereby the locking bolts may be moved to inoperative position. It further consists in a spring actuated pawl to engage the cam at the end of its movement when actuated to move the locking bolts to inoperative position. It also consists in providing a key-actuated lock to move the pawl out of engagement with the cam so that the cam and the bolts may be moved to operative or locking position. It also consists in the details of construction illustrated in the accompanying drawings and particularly pointed out in the claims.

Figure 1:
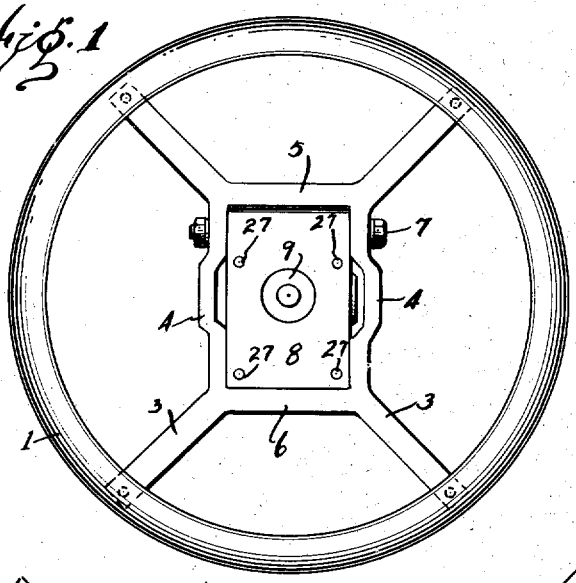
Figure 2:
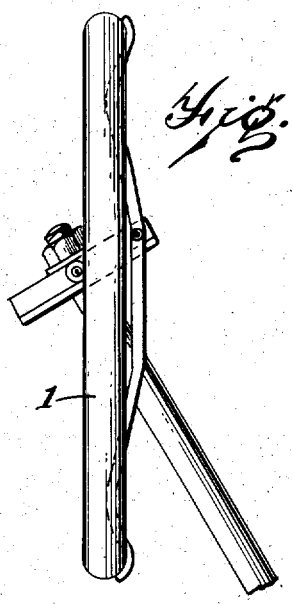
Figure 4:
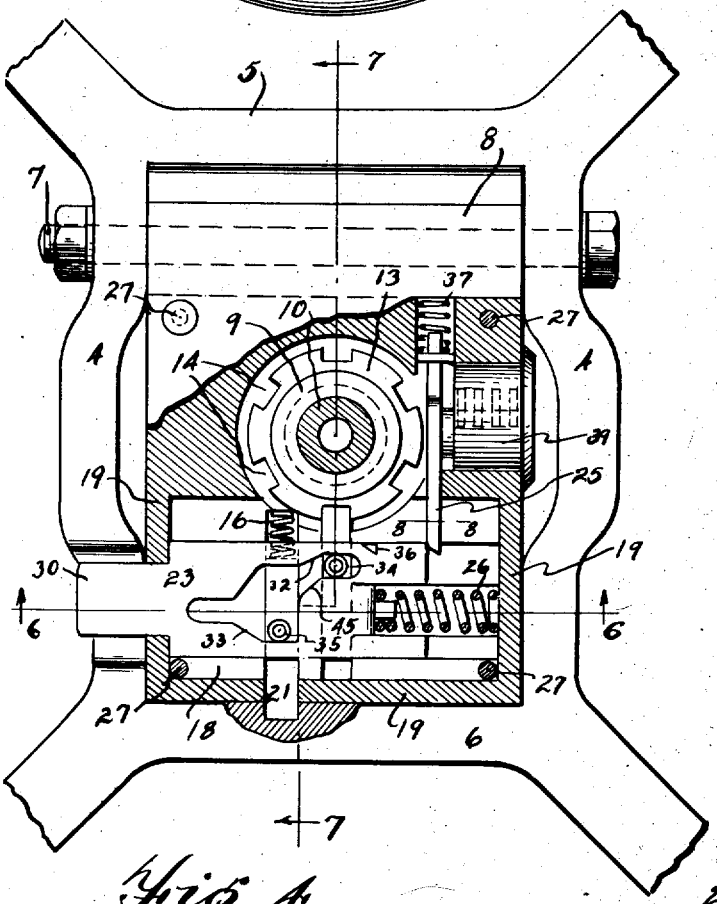
Figure 3:
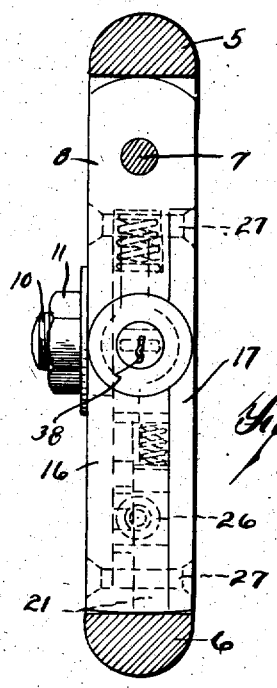
Figure 6:
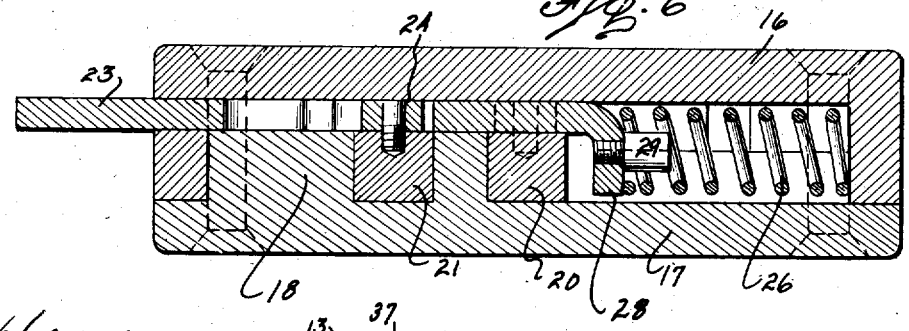
Figure 5:
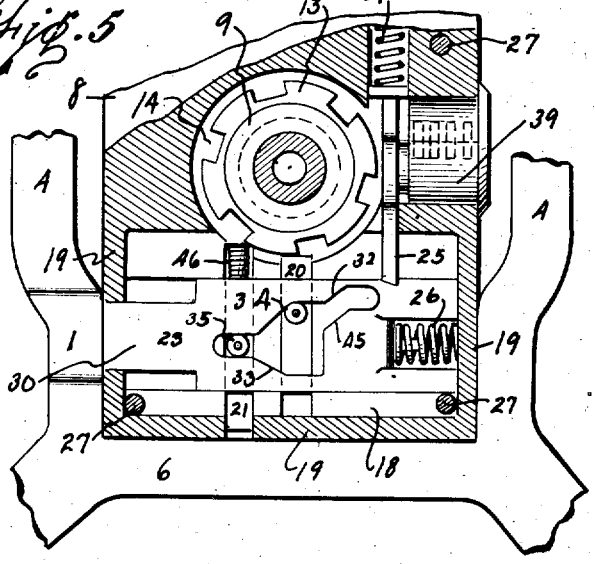
Figure 7:
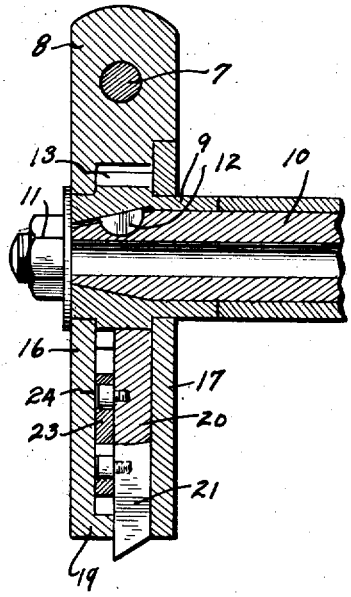
Figure 8:
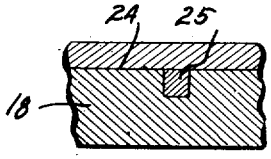
Figure 9:
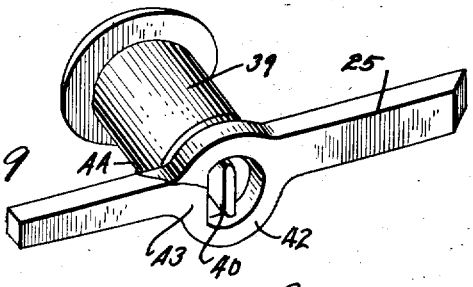

In the drawings, Fig. 1 is a plan of this improved steering wheel and Fig. 2 is a side elevation thereof when mounted on a steering post. Fig. 3 is a side elevation of the wheel head and Fig. 4 is a plan of the head and the adjacent portions of the spider, parts being broken away for the sake of showing the interior mechanism in locking position. Fig. 5 is a plan of the interior mechanism in unlocking position. Figs. 6, 7 and 8 are sections on the lines 6—6, 7—7 and 8—8 of Fig. 1 respectively. Fig. 9 is a perspective of the pawl and a lock therefor.

Similar reference characters refer to like parts throughout the several views.

The steering wheel shown in Figs. 1 and 2 has a rim 1 and a spider comprising the arms 3 and a central rectangle consisting of the side bars 4 and end or cross bars 5 and 6. A bolt 7 connects the spider to the head 8, which is preferably rectangular and rotatably mounted on the bushing 9 which is rigidly secured to the steering post 10 by means of a nut 11 and a key 12. The bushing has a collar 13 provided with locking notches 14 for the locking bolt.

The head is formed of the main or top part 16 and the bottom 17. The hinge end of the head is preferably solid but the major portion of the opposite end is cored out to receive the part 17. The part 17 consists generally of a flat plate on which is a rectangular boss 18 that fits between the side flanges 19 on the top member 16. This boss is formed with longitudinal rectangular grooves to receive the locking bolts 20 and 21 and with a transverse shallow flat groove to receive the cam-plate 23. It is also formed with grooves to receive the pawl 25 and the spring 26. The two parts 16 and 17 are properly machined to fit the ends of the bushing so as to be freely rotatable thereon.

When the boss 18 is slipped up in between the flanges 19, the remainder of the top of the boss and the cam-plate 23 will bear against the bottom 24 of the recess in the upper member, as shown in Fig. 6. Rivets 27 are used to hold the two parts of the head together. The cam-plate may have a downturned tongue 28 (Fig. 6) which carries a pin 29 to position the spring 26.

When the parts are as shown in Fig. 4, the bolt 20 engages in a notch 14 in the bushing and locks the head to the steering post while the bolt 21 engages in a notch in the cross bar 6 of the spider and holds the rim in a plane at right angles to the steering post. The rim, spider, head and bushing act as one piece. If now the extension 30 on the cam-plate be pushed in to carry the cam-plate to the position shown in Fig. 5, the cam faces 32 and 33, in engagement with the pins 34 and 35 on the bolts 20 and 21 respectively, will pull in these bolts, disengaging the bolt 20 from the bushing 9 and the bolt 21 from the cross bar 6. The rim may now swing to the position shown in Fig. 2 and the head may be freely rotated without turning the steering post. When the cam-plate reaches this inward position the pawl 25 will be forced into the notch 36 by the spring 37 and hold all the parts in the positions shown in Fig. 5.

In order to bring the parts to operative position, a key is inserted in the keyhole 38 (Fig. 3) and the barrel of the lock 39 is turned. The flat lug 40 on the inner end of the barrel extends into the opening 42 in the enlarged part 43 of this pawl, as shown in Fig. 9. When the key is turned, this lug will press back the wall 44 and withdraw the pawl from the notch 36, whereupon the spring 26 will move the cam-plate outward sufficiently to move this notch out of line with the pawl. The key is then withdrawn and the wheel swung up to operative position and turned until the bolt 20 comes into alinement with a notch 14 whereupon the cam face 45 under push of the spring 26 will force the bolt into this notch and the spring 46 will force the bolt 21 into the notch in the cross bar 6. The length of the cam face 33 is such that the bolt 21 may be withdrawn by the cam-plate before the notch 36 reaches the pawl 25 so that the wheel may be swung down and the head disengaged from the bushing 9 without the cam-plate being locked. But when the cam-plate is pushed in to the limit of its movement, the wheel cannot again be used until the pawl 25 is withdrawn by the use of a proper key. It will be understood that the lock shown is merely a suggestion and that any other type may be used.

The proportions and sizes and construction of the details as well as the relative positions of the various parts may all be changed without departing from the spirit of my invention as set forth in the following claims.

I claim:—

1. In a steering wheel, the combination of a bushing secured to the steering post of the vehicle and provided with a notch, a head rotatably mounted on the bushing, a wheel pivoted on the head, a bolt slidable into said notch to connect the head to the bushing, a second bolt to lock the wheel in position on the head, and means to move the bolts to inoperative position, said means comprising a slidable cam-plate adapted to be manually operated.

2. In a steering wheel, the combination of a bushing secured to the steering post of the vehicle and provided with a notch, a head rotatably mounted on the bushing, a wheel pivoted on the head, a bolt slidable into said notch to connect the head to the bushing, a second bolt to lock the wheel in position on the head, and means to move the bolts to inoperative position, said means comprising a slidable cam-plate adapted to be manually operated and a spring to return the plate to normal position.

3. In a steering wheel for vehicles, the combination of a bushing secured to the steering post of the vehicle and provided with a notch, a head rotatably mounted on the bushing, a wheel pivoted on the head, a bolt slidable into said notch to connect the head to the bushing, a second bolt to lock the wheel in position on the head, a slidable cam-plate to move the bolts to inoperative position, a pawl to lock the cam-plate at one end of its movement to hold the bolts in inoperative position, and a key-operated lock to withdraw the pawl to release the cam-plate.

4. In a steering wheel for vehicles, the combination of a bushing secured to the steering post of the vehicle and provided with a notch, a head rotatably mounted on the bushing, a wheel pivoted on the head, a bolt slidable into said notch to connect the head to the bushing, a second bolt to lock the wheel in position on the head, a slidable-cam-plate to move the bolts to inoperative position, a pawl to lock the cam-plate at one end of its movement to hold the bolts in inoperative position, a key-operated lock to withdraw the pawl to release the cam-plate, and a spring to press back the cam-plate to move one of the bolts to lock the head to the bushing.

5. In a steering wheel for vehicles, the combination of a bushing secured to the steering post of the vehicle and provided with a notch, a head rotatably mounted on the bushing and a wheel connected to the head, a bolt mounted in the head and adapted to enter the notch to lock the head to the bushing, and a slidable cam-plate to move the bolt toward and from the bushing.

6. In a steering wheel for vehicles, the combination of a bushing secured to the steering post of the vehicle and provided with a notch, a head rotatably mounted on the bushing and a wheel connected to the head, a bolt mounted in the head and adapted to enter the notch to lock the head to the bushing, a slidable cam-plate to move the bolt toward and from the bushing, a pawl to lock the cam-plate at one end of its movement, and a key-operated lock to withdraw the pawl.

7. In combination with a steering shaft and a head rotatably mounted thereon, a steering wheel structure movable on said head, and means by which the shaft and the wheel structure may be simultaneously or consecutively locked to said head.

8. In combination with a steering shaft and a head rotatably mounted thereon, a steering wheel structure movable on said head, and means mounted entirely within the head by which the shaft and the wheel structure may be simultaneously or consecutively locked to said head.

9. In combination with a steering shaft and a head mounted thereon, a steering wheel structure mounted on said head, and releasable means to simultaneously allow the head rotary movement on the axis of the shaft and movement of the wheel structure on the head, said means also permitting the shaft and wheel structure being simultaneously or consecutively locked to said head.

10. In combination with a steering shaft and a head mounted thereon, a steering wheel structure mounted on said head, and releasable means mounted in the head to simultaneously allow the head rotary movement on the axis of the shaft and movement of the wheel structure on the head, said means also permitting the shaft and wheel structure being simultaneously or consecutively locked to said head.

11. In combination with a steering shaft and a head mounted thereon, a steering wheel structure mounted on said head, and releasable means adapted when in one position to simultaneously allow the head rotary movement on the axis of the shaft and permit movement of the wheel structure on the head, and when said means are in another position permitting the shaft and wheel structure to be simultaneously or consecutively locked to said head.

12. In combination with a steering shaft and a head mounted thereon, a steering wheel structure mounted on said head, and releasable means mounted in the head adapted when in one position to simultaneously allow the head rotary movement on the axis of the shaft and permit movement of the wheel structure on the head, and when said means are in another position permitting the shaft and wheel structure to be simultaneously or consecutively locked to said head.

13. In combination with a steering shaft and a head mounted thereon, a steering wheel structure mounted on said head, and releasable means adapted when in one position to simultaneously allow the head rotary movement on the axis of the shaft and permit movement of the wheel structure on the head, and when said means are in another position to lock the shaft to the wheel structure and simultaneously or subsequently lock the wheel structure to the head, and a lock to hold said releasable means in inoperative position.

14. In combination with a rotatable steering shaft and a head mounted thereon, a steering wheel structure movable on said head, means to prevent rotation of said shaft by the wheel, said means also simultaneously or consecutively allowing rotation of said shaft and preventing movement of the wheel structure on the head.

15. In combination with a rotatable steering shaft and a head mounted thereon, a steering wheel structure movable on said head, means when in one position simultaneously allowing movement of the wheel structure on the head and preventing rotation of said shaft by the wheel, said means when in another position also simultaneously or consecutively allowing rotation of said shaft and preventing movement of the wheel structure.

16. In combination with a rotatable steering shaft and a head mounted thereon, a steering wheel structure embodying a rim and a spider tiltable on said head, means mounted in the head to allow movement of the wheel structure on the head and prevent rotation of said shaft by said wheel, said means also simultaneously or consecutively allowing rotation of said shaft and preventing movement of the wheel structure on the head.

EDWARD N. PAGELSEN.